US006022486A

United States Patent [19]

Tokai et al.

[11] Patent Number: 6,022,486

[45] Date of Patent: Feb. 8, 2000

[54] REFRIGERATOR COMPRISING A REFRIGERANT AND HEAT REGENERATIVE MATERIAL

[75] Inventors: Yoichi Tokai; Masashi Sahashi, both of Yokohama, Japan

[73] Assignee: Kabushiki Kaisha Toshiba, Kawasaki, Japan

[21] Appl. No.: 07/804,501

[22] Filed: Dec. 10, 1991

Related U.S. Application Data

[63] Continuation of application No. 07/536,083, Jun. 11, 1990, abandoned, which is a continuation of application No. 07/305,169, Feb. 2, 1989, abandoned.

[30] Foreign Application Priority Data

| | | | |
|---|---|---|---|
| Feb. 2, 1988 | [JP] | Japan | 63-21218 |
| Sep. 9, 1988 | [JP] | Japan | 63-225916 |

[51] Int. Cl.[7] .............................. C09K 5/00; F25B 21/00

[52] U.S. Cl. .............................. 252/67; 252/70; 252/62; 62/3.1; 62/6; 165/4

[58] Field of Search .............................. 252/67, 62, 70; 62/6, 3.1; 165/4

[56] References Cited

U.S. PATENT DOCUMENTS

| | | | |
|---|---|---|---|
| 3,560,200 | 2/1971 | Nesbitt et al. | 420/416 |
| 3,664,892 | 5/1972 | Becker | 420/435 |
| 3,677,947 | 7/1972 | Ray et al. | 148/301 |
| 4,028,905 | 6/1977 | Andres et al. . | |
| 4,082,138 | 4/1978 | Miedema | 165/4 |
| 4,208,225 | 6/1980 | Kurz et al. | 148/301 |
| 4,327,550 | 5/1982 | Knöös | 60/522 |
| 4,651,808 | 3/1987 | Mizuno | 165/4 |
| 4,760,875 | 8/1988 | Gibson | 165/4 |
| 4,807,695 | 2/1989 | Ward | 165/4 |
| 4,829,770 | 5/1989 | Hashimoto | 62/3.1 |
| 4,866,943 | 9/1989 | Purcell | 165/4 |
| 4,901,787 | 2/1990 | Zornes | 165/4 |
| 4,985,072 | 1/1991 | Sahashi | 75/246 |

FOREIGN PATENT DOCUMENTS

| | | |
|---|---|---|
| 0193743 | 9/1986 | European Pat. Off. . |
| 0217347 | 4/1987 | European Pat. Off. . |
| 900483 | 3/1978 | Japan . |
| 1458958 | 8/1975 | United Kingdom . |

OTHER PUBLICATIONS

Binary Phase Diagrams, Thaddeus Massalski, Ed. Am. Soc for Metals, 1986. pp. 763–764, 912–913, 1029–1030.

Cryogenics, May 1975 Extremely Large Heat Capacities Between 4 and 10 K, K.H.J. Buschow et al, pp. 261–264.

"Handbook on the Physics and Chemistry of Rare Earths, vol. 2" (pp. 87–89, pp. 104–107), 1979.

"Advances in Cryogenic Engineering Materials", vol. 32, pp. 295–301, A. Tomokiyo et al.

*Advances in Cryogenic Engineering Materials,* vol. 32, 1986, A Tomokiyo, etc. pp. 295–301.

*Proceedings of ICEC* '86 B. Barbisch, J.L. Olsen, etc.

*Primary Examiner*—Necholus Ogden

*Attorney, Agent, or Firm*—Oblon, Spivak, McClelland, Maier & Neustadt, P.C.

[57] ABSTRACT

A magnetic substance represented by the following general formula (I):

$$AMz \quad (I)$$

where A is at least one rare earth element selected from the group consisting of Y, La, Ce, Pr, Nd, Pm, Sm, Eu, Gd, Tb, Dy, Ho, Er, Tm, and Yb, M is at least one metal selected from the group consisting of Ni, Co, and Cu, and z is 0.001 to 9.0. This magnetic substance has its maximal of specific heat, due to magnetocaloric effect, at extremely low temperatures, the maximal value of specific heat being great. It also has a great lattice specific heat. A regenerator filled with the magnetic substance exhibits an excellent heat regeneration efficiency at extremely low temperature.

16 Claims, 4 Drawing Sheets

REFRIGERATOR COMPRISING A REFRIGERANT AND HEAT REGENERATIVE MATERIAL

This application is a Continuation of application Ser. No. 07/536,083, filed on Jun. 11, 1990, know abandoned which is a Continuation of application Ser. No. 07/305,169 filed Feb. 2, 1989, abandoned.

BACKGROUND OF THE INVENTION

1. Field of the Invention

The present invention relates to a magnetic substance which exhibits a great specific heat at extremely low temperatures.

The invention also relates to a low-temperature regenerator which exhibits excellent recuperativeness at extremely low temperatures.

2. Description of the Prior Art

In recent years, superconduction technology has remarkably advanced and has been applied to more and more technical fields. Along with the increasing use of the technology, demands are increasing for a high-efficiency, small refrigerator for cooling superconductive components. In other words, it is greatly demanded that a refrigerator be developed which is light and small and has a high heat-efficiency. At present, such refrigerators are being developed in two ways. The first method is to enhance the efficiency of the existing gas-cycle refrigerator by adopting, for example, the Stirling cycle. The second method is to employ new refrigeration system in place of the conventional gas-cycle refrigeration. The new refrigeration system includes heat-cycle using magnetocaloric effect, such as a Carnot-type and an Ericsson-type cycle.

Among the gas-cycle refrigerators with enhanced efficiency are: a refrigerator which operates in the Strirling cycle; a refrigerator which operates in the Vuilleumier cycle; and a refrigerator which operates in the Gifford-Mc Mahon cycle. Each of these refrigerators has a regenerator packed with regenerative materials. A working medium is repeatedly passed through the regenerator, thereby obtaining a low temperature. More specifically, the working medium is first compressed and then made to flow in one direction through the regenerator. As the medium flows through the regenerator, heat energy is transferred from the medium to the generative materials. Thus, the working medium is deprived of heat energy. When the medium flows out of the regenerator, it is expanded to have its temperature lowered further. The working medium is then made to flow in the opposite direction, through the regenerator again. This time, heat energy is transferred from the regenerative materials to the medium. The medium is passed twice, back and forth, through the regenerator in one refrigeration cycle. This cycle is repeated, thereby obtaining a low temperature.

The recuperativeness of the generative materials is the determinant of the efficiency of the refrigerator. The greater the recuperativeness the generative materials have, the higher the heat-efficiency of each refrigeration cycle.

The regenerative materials used in the conventional regenerators are particles of lead or bronze particles, or nets of cupper or phosphor bronze. These regenerative materials exhibit but a very small specific heat at extremely low temperatures of 20 K or less. Hence, they cannot sufficiently accumulate heat energy at extremely low temperatures, in each refrigeration cycle of the gas-cycle refrigerator. Nor can they supply sufficient heat energy to the working medium. Consequently, any gas-cycle refrigerator which has a regenerator filled with such regenerative materials fails to obtain an extremely low temperatures.

This problem can be solved by using regenerative materials which exhibit a great specific heat per unit volume (i.e., volume specific heat) at extremely low temperatures. Much attention is paid to some kinds of magnetic substances as such regoenerative materials, since they exhibit magnetocaloric effect, that is, their specific heats greatly change at their magnetic transition temperatures. Hence, any mnagnetic substance, whose magnetic transition temperature is extremely low, can make excellent regenerative materials.

One of such magnetic substances is the R-Rh intermetallic compound (where R is Sm, Gd, Tb, Dy, Ho, Er, Tm, or Yb) disclosed in Japanese Patent Disclosure No. 51-52378. This compound has a maximal value of volume specific heat which is sufficiently great at 20 K or less.

One of the components of this intermetallic compound is rhodium (Rh). Rhodium is a very expensive material. In view of this, it is not suitable as a component of regenerative materials which are used in a regenerator, in an amount of hundreds of grams.

The R-Rh intermetallic compound has a small volume specific heat at temperatures higher than 20 K. This is because the compound has but a small lattice specific heat. The lattice specific heat is largely responsible for the volume specific heat of the compound unless the volume specific heat increases due to the magnetocaloric effect. Hence, other regenerative materials must be used to obtain a low temperature down to 20 K in a gas-cycle refrigerator system utilizing the R-Rh intermetallic compound.

Conventionally, copper is used as the regenerative material for cooling from room temperature down to about 40 K, and lead is used as the regenerative material for cooling from 40 K down to about 20 K. Therefore, in order to obtain an extremely low temperatures of less than 20 K in a refrigerator system utilizing the R-Rh intermetallic compound, the three different regenerative materials (Cu, Pb and R-Rh compound) will have to be successively used in accordance with the temperature ranges to which the refrigerator system reaches.

SUMMARY OF THE INVENTION

One of the objects of the present invention is to provide a magnetic substance which has a maximal of specific heat and also a great lattice specific heat at extremely low temperatures such as the boiling point of liquid nitrogen, due to its magnetocaloric effect, and which is relatively inexpensive and has yet good thermal conductivity and high recuperativeness.

Another object of the present invention is to provide a low-temperature regenerator which is filled with the magnetic substance described above.

According to the present invention, there is provided a magnetic substance represented by the following general formula (I)

$$AMz \qquad (I)$$

where A is at least one rare earth element selected from the group consisting of Y, La, Ce, Pr, Nd, Pm, Sm, Eu, Gd, Tb, Dy, Ho, Er, Tm, and Yb; M is at least one metal selected from the group consisting of Ni, Co, and Cu, and z is 0.001 to 9.0.

A magnetic substance which has the composition represented by the general formula (I) has good thermal conductivity of 10 mW/Kcm or more. This substance has great lattice specific heat and exhibits prominent magnetocaloric effect at extremely low temperatures, in particular at 40 K or less.

The magnetic substance having the composition of the general formula (I) can be used as a material of the regenerative materials to be packed in a low-temperature regenerator which is preferably used for gas-cycle refrigerator. It can also be used as a stabilizer for maintaining components in a superconductive condition.

The low-temperature regenerator according to the present invention is filled with regenerative materials comprising at least one of the magnetic substances represented by the general formula (I). This regenerator can give and take a great deal of thermal energy at extremely low temperatures, and is yet relatively inexpensive.

DETAILED DESCRIPTION OF THE PREFERRED EMBODIMENTS

The magnetic substance according to the present invention has the composition represented by the following general formula (I);

$$AMz \qquad (I)$$

where A is at least one rare earth element selected from the group consisting of Y, La, Ce, Pr, Nd, Pm, Sm, Eu, Cd, Tb, Dy, Ho, Er, Tm, and Yb; M is at least one metal selected from the group consisting of Ni, Co, and Cu, and z is 0.001 to 9.0.

It is important that z must fall within the range from 0.001 to 9.0. If the value is less than 0.001, the temperature at which the magnetic substance has the maximal of specific heat is over 77 K, i.e., the boiling point of liquid nitrogen, due to the exchange interaction among the rare earth element used. On the other hand, if z is greater than 9.0, the density of the rare earth elements decreases, inevitably reducing the maximal value of specific heat which the substance exhibits at extremely low temperatures.

Preferably, z should be 0.01 or more, and less than 2.0. When z falls within this range, the magnetic substance represented by the general formula (I) has a volume specific heat higher than that of a conventional magnetic substance, at a temperature higher than the temperature at which the specific heat of the substance reaches a maximal. This is perhaps because the eutectic crystal of the rare earth element A and the metal M (e.g., Ni), which is formed as can be understood from the phase diagram, much lowers the melting point of the magnetic substance, thereby increasing the lattice specific heat of the magnetic substance.

Figure 1:
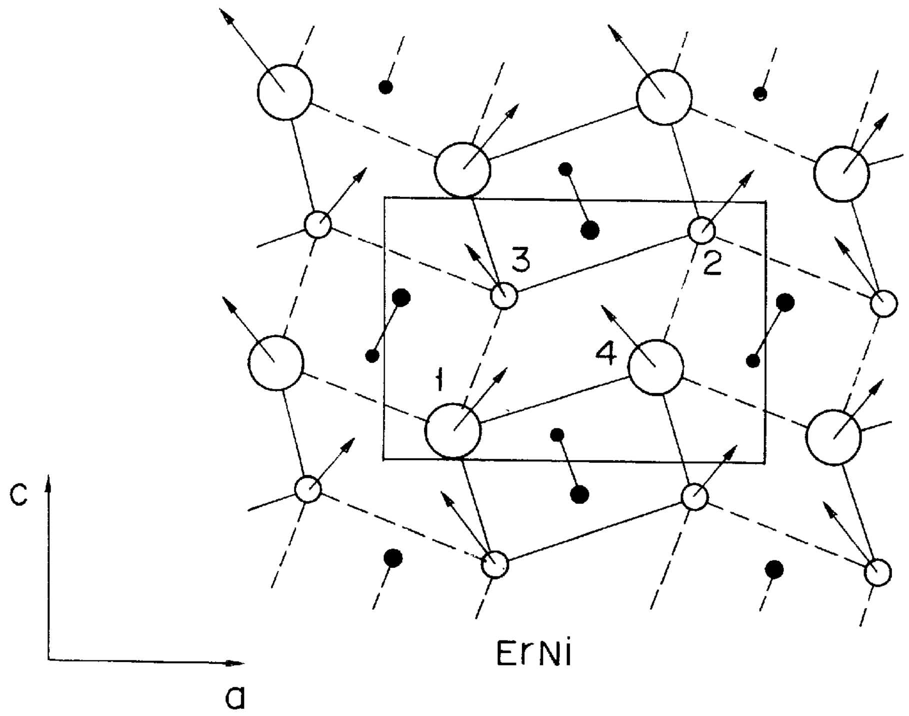
FIG. 1 is a diagram showing the spin arrangement of ErNi.
Figures 2A, 2B:
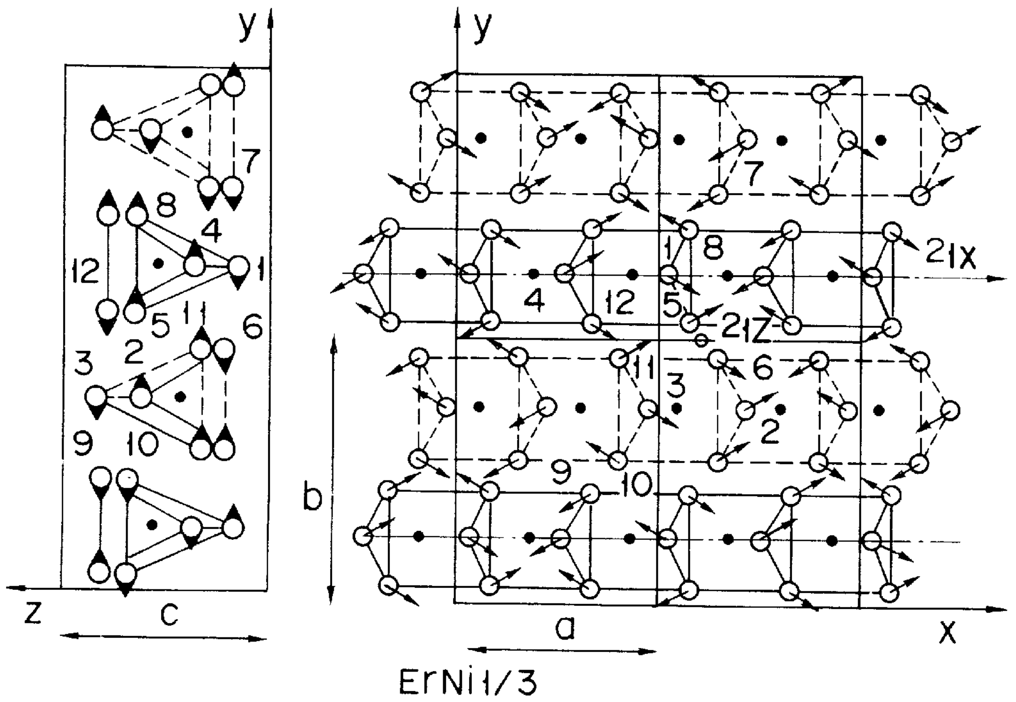
FIG. 2A is a diagram showing the spin arrangement of $ErNi_{1/3}$ as viewed in the direction along Z-axis.
FIG. 2B is a diagram showing the spin arrangement of Er $Ni_{1/3}$ as viewed in the direction along X-axis.

When z is 0.01 or more, and less than 2.0, the magnetic substance has a complex spin arrangement. For example, ErNi has such a spin arrangement as is shown in FIG. 1, and $ErNi_{1/3}$ has such a spin arrangement as is illustrated in FIGS. 2A and 2B by arrows. In FIG. 1, a and c represent crystallographic axises. In FIG. 2A, x and y represent crystallographic axises, and a and b respectively represent the length of unit lattice of crystal in the direction of x-axis and the length of unit lattice of crystal in the direction of y-axis. In FIG. 2B, y and z represent crystallographic axises, and c represents the length of unit lattice of crystal in the direction of z-axis. Further, in FIGS. 2A and 2B, the same atoms are indicated by the same reference numerals. In the case of a magnetic substance that has such a complex spin arrangement, the atoms go into a complicated exchange interaction. Consequently, the peak of the specific heat of the magnetic substance is essentially broad at temperatures near the magnetic transition temperature. This means that the magnetic substance can be practically used over a broad range of temperature.

More preferable value for z is 1.5. Still more desirable value for z is 1.0. The lower limit of z should better be set at 0.01 from a practical view of point. The most preferable range of z is: $1/3 \leqq z \leqq 1.0$. As long as z falls within this range, the magnetic substance has a great volume specific heat at the temperature corresponding to a maximal of specific heat.

The regenerator according to the present invention is filled with regenerative material made of at least one of the magnetic substances represented by the general formula (I). When any one or more of the magnetic substances represented by the formula (I) are filled in the regenerator, they should preferably be used in the form of particles having an average diameter of 1 to 2,000 $\mu$m or filaments having an aspect ratio of 2 or more and an average diameter of 1 to 2,000 $\mu$m. They should be of either form, since particles or filaments, once packed in the regenerator, transmit heat uniformly and help to reduce the pressure loss of the working medium which flows through the regenerator. If the particles or filaments of the magnetic substances, which are packed in the regenerator, have an average diameter of less than 1 $\mu$m, they will likely to flow out of the regenerator, along with a high-pressure working medium (e.g., helium gas). On the other hand, if the particles or filaments of the magnetic substances, which are packed in the regenerator, have an average diameter of more than 2,000 $\mu$m, the thermal conductivity of the substances will likely to restrict the thermal conduction between the working medium, on the one hand, and the magnetic substances, on the other hand. Hence, when the substances have a low thermal conductivity, this conduction will be decreased, inevitably impairing the recuperative effect of the regenerator.

It will now be explained why the upper limit of the average diameter of the particles or filaments is 2,000 $\mu$m in the present invention. The effective volume of any regenerative substance, which is the important factor for accumulating heat, is determined by immersion depth id which represents the propagation distance of heat within the mass of the regenerative substance. This immersion depth td is given as follows:

$$ld=\lambda/(\rho Cp\pi f)$$

where $\lambda$ is the thermal conductivity of the regenerative substance, $\rho$ is the density of the regenerative substance, Cp is the specific heat of the regenerative substance, and f is the frequency. When the regenerative substance is particles of $ErNi_{1/3}$ which has a relatively great volume specific heat (ρCp) of 0.3 $J/cm^3K$ at 6 K or more, the immersion depth ld is about 600 μm since the substance has thermal conductivity of 80 mW/Kcm. Any portion of each $ErNi_{1/3}$ particle, which is at a distance of 600 μm or more from the surface of the particle, does not contribute to the accumulation of heat. Obviously, the upper limit of the diameter of the $ErNi_{1/3}$ particle is 1,200 μm, or preferably 1,000 μm.

The particles of the magnetic substance can be made by one of the following methods:

(a) To drop the molten substance into water or oil, drop by drop.

(b) To inject the molten substance into a turbulent flow of a liquid or a gas.

(c) To drop or inject the molten substance onto a cooled plate or a cooled hollow cylinder, either made of metal.

(d) To heat particles of the substance, which have various shapes, and inject them into a flow of an inert gas such as argon.

Of these methods of forming particles of the magnetic substance, the method (d) is the most practical. In this method, the substance can be heated with heat plasma, arc-discharge plasma, infrared rays, or high-frequency waves. Plasma spraying, wherein plasma is used, is the easiest and the most practical process. In the method (d), it is desirable that the pressure of the inert gas be maintained at 1 atm. or more. When the gas pressure is 1 atm. or more, refrigeration efficiency is high enough to solidify the molten magnetic substance, in the form of drops which is spherical due to the surface tension.

The filaments of the magnetic substance includes fibers which are coated with the molten substance on its surface. The fibers can be metal fibers made of tungsten or boron, glass fibers, carbon fibers, plastic fibers, or the like. The coating of these fibers can be accomplished by a vapor-phase growth such as flame spraying or sputtering, or a liquid-phase growth.

Preferably, the regenerator according to this invention should be packed with at least one kind of magnetic particles or filaments which have an average diameter of 1 to 2,000 μm and are made of a composition represented by the following general formula (II) or (III):

$$ANiz \qquad (II)$$

where A is at least one rare earth element selected from the group consisting of Y, La, Ce, Pr, Nd, Pm, Sm, Eu, Gd, Tb, Dy, Ho, Er, Tm, and Yb, and z is 0.1 to 9.0.

$$A'_{1-x}D_xM_z \qquad (III)$$

where A' is at least one heavy rare earth element selected from the group consisting of Er, Ho, Dy, Tb and Gd, D is at least one light rare earth element selected from the group consisting of Pr, Nd, Sm and Ce, M is at least one metal selected from the group consisting of Ni, Co, and Cu, x is equal to or greater than zero, and less than 1, and z is 0.01 to 9.0.

In the formula (III), the heavy rare earth element A' represents a rare earth element having relatively large atomic weight, and the light rare earth element D represents a rare earth element having relatively small atomic weight.

In either formula, (II) or (III), it is desirable that z be equal to or greater than 0.1, and less than 2.0.

An alloy of heavy rare earth element A' and metal M such as Ni has a prominent magnetocaloric effect, and helps to increase the maximal value of specific heat of the magnetic substance. When any of the light rare earth element D is used in place of the heavy rare earth element A', Schottky anormaly will take place, which makes it possible to adjust the maximal value of specific heat of the magnetic substance, and also control the half value width of the peak of the specific heat.

When the low-temperature regenerator according to the invention is packed with two or more of magnetic substances represented by the general formula (I), the peak of the specific heat will become broad, though the heat capacity of the regenerator will decrease a little. As a result, the regenerative substance, as a whole, has a great specific heat over a broad range of temperatures. The regenerator can therefore have its recuperativeness sufficiently improved.

Moreover, the regenerator according to the present invention can be packed with various types of magnetic substances which has their respective maximal values of the specific heat at different temperatures. In this case, the regenerator can have a still better recuperativeness only if the magnetic substances used are those which, in combination, selected in accordance with the temperature gradient generated in the regenerator.

A magnetic substance represented by the general formula (I), but different in that part of M is substituted by B, Al, Ga, In, Si, or the like, may be used in a low-temperature regenerator. This magnetic substance can be identified with the following general formula (IV) or (V):

$$A(M_{1-y}L_y)z \qquad (IV)$$

where A is at least one rare earth element selected from the group consisting of Y, La, Ce, Pr, Nd, Pm, Sm, Eu, Gd, Tb, Dy, Ho, Er, Tm, and Yb; M is at least one metal selected from the group consisting of Ni, Co, and Cu; L is at least one compound-forming element selected from the group consisting of B, At, Ga, In, Si, Ge, Sn, Pb, Ag, Au, Mg, Zn, Ru, Pd, Pt, Re, Cs, Ir, Fe, Mn, Cr, Cd, Hg, and Os; y ranges from 0 to 0.3 when L is Fe, and y is equal to or greater than 0 and less than 1.0 when L is not Fe, preferably from 0 to 0.5; and z ranges from 0.001 to 9.0.

$$A'_{1-x}D_x(M_{1-y}L_y)z \qquad (V)$$

where A' is at least one heavy rare earth element selected from the group consisting of Er, Ho, Dy, Tb, and Gd; D is at least one light rare earth element selected from the group consisting of Pr, Nd, Sm, and Ce; L is a compound-forming element selected from the group consisting of B, Al, Ga, In, Si, Ge, Sn, Pb, Ag, Au, Mg, Zn, Ru, Pd, Pt, Re, Cs, Ir, Fe, Mn, Cr, Cd, Hg, and Os; x is equal to or greater than 0, and less than 1; y ranges from 0 to 0.3 when L is Fe, and is equal to or greater than 0, and less than 1.0, preferably from 0 to 0.5, when L is not Fe; and z is 0.001 to 9.0.

In the formula (V), the heavy rare earth element and the light rare earth element represent the same meanings as in formula (III).

A substance made of one or more of the magnetic substances represented by the general formulas (IV) and (V) can also be used as the regenerative substance in a low-temperature regenerator. When the substituent metal L is Fe, y must be 0.3 or less. If L is Fe and y is greater than 0.3, or Fe is used in an excessive amount, the regenerative substance will has its maximal of the specific heat at a temperature as high as 77 K since the Fe—Fe exchange interaction is prominent.

It will now be explained how a regenerator according to the invention, which uses the magnetic substance described above applies to a refrigerator.

Figure 5A:
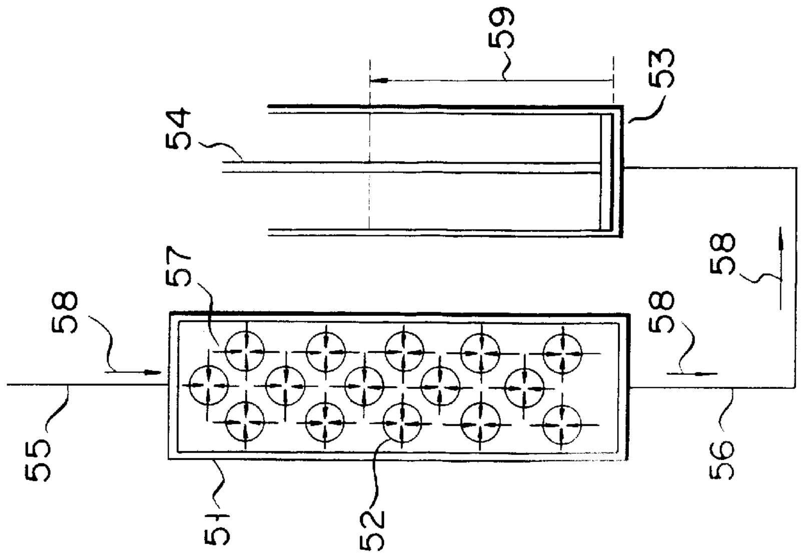
FIGS. 5A to 5C are diagrams which illustrate an application of a regenerator of the invention to gas-cycle refrigerator.
Figure 5B:
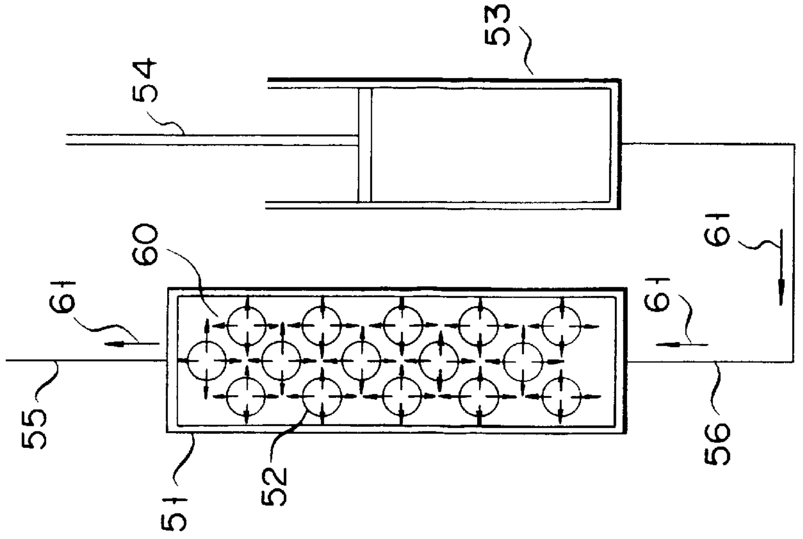
Figure 5C:
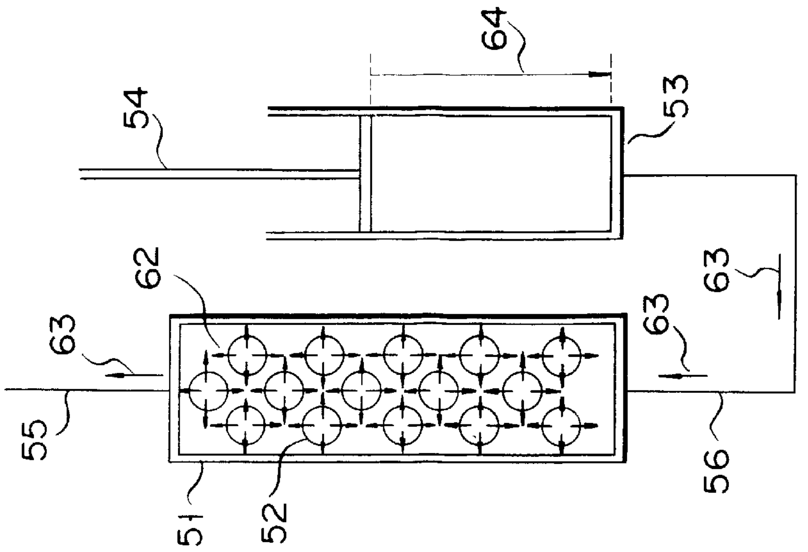

As is schematically shown in FIGS. 5A to 5C, regenerator 51 is filled with regenerative material 52. One end of regenerator 51 is connected to a working medium source (not shown) by pipe 55. The other end of regenerator 51 is connected to expansion cylinder 53 by pipe 56. Piston 54 is slidably provided within expansion cylinder 53. When piston 54 is moved, the internal volume of cylinder 53 is changed.

Regenerator 51 is cooled in the following four steps I to IV which make one cycle of refrigeration.

In step I, as is shown in FIG. 5A, piston 54 is moved in the direction of arrow 59, thereby increasing the internal volume of expansion cylinder 53 and introducing high-pressure gas from the working medium source into cylinder 53, in the direction of arrow 58. The high-pressure gas passes through regenerator 51 before flowing into expansion cylinder 53. As it passes through regenerator 51, it is cooled by regenerative material 52. The gas, thus cooled, is accumulated in expansion cylinder 53.

In step II, as is illustrated in FIG. 5B, a part of the gas is discharged from expansion cylinder 53 in the direction or arrow 61, while maintaining the internal volume of cylinder 53. As a result, the gas remaining in cylinder 53 expands, thus lowering the temperature in expansion cylinder 53. The gas discharged from cylinder 53 is applied into regenerator 51 through pipe 56. As this gas passes through regenerator 51, it takes heat from regenerative material 52. Arrows 61 represent the directions in which heat is transferred within regenerator 51.

In step III, as is shown in FIG. 5C, piston 54 is moved in the direction of arrow 64, thereby discharging the low-temperature, low-pressure gas from expansion cylinder 53 into regenerator 51 via pipe 56 in the direction of arrow 63. As this gas flows through regenerator 51, it deprives regenerative material 52 of heat. In other words, the gas cools material 52. Arrows 62 indicate the direction in which heat is transferred within regenerator 51.

In the last step IV, the operation goes back to step I.

Some examples of the present invention will now be described in detail.

EXAMPLE 1 to 3

Three magnetic substances, $ErNi_{1/3}$ (Example 1), ErNi (Example 2), and $ErNi_2$ (Example 3) were prepared by means of an arc furnace. Each of these magnetic substances was heated at 700° C. for 24 hours. After this heat treatment, each substance was crushed by a Brown mill into particles. The particles were classified, thereby obtaining fine powder whose grain size was 100 to 200 $\mu$m. Thereafter, 200 g of each magnetic powder was plasma-sprayed in an argon atmosphere. Thus, three powdery, magnetic substances (Examples 1–3) were prepared. The argon gas had pressure of 1.8 atms. at the final stage of the plasma spraying.

Figure 3:
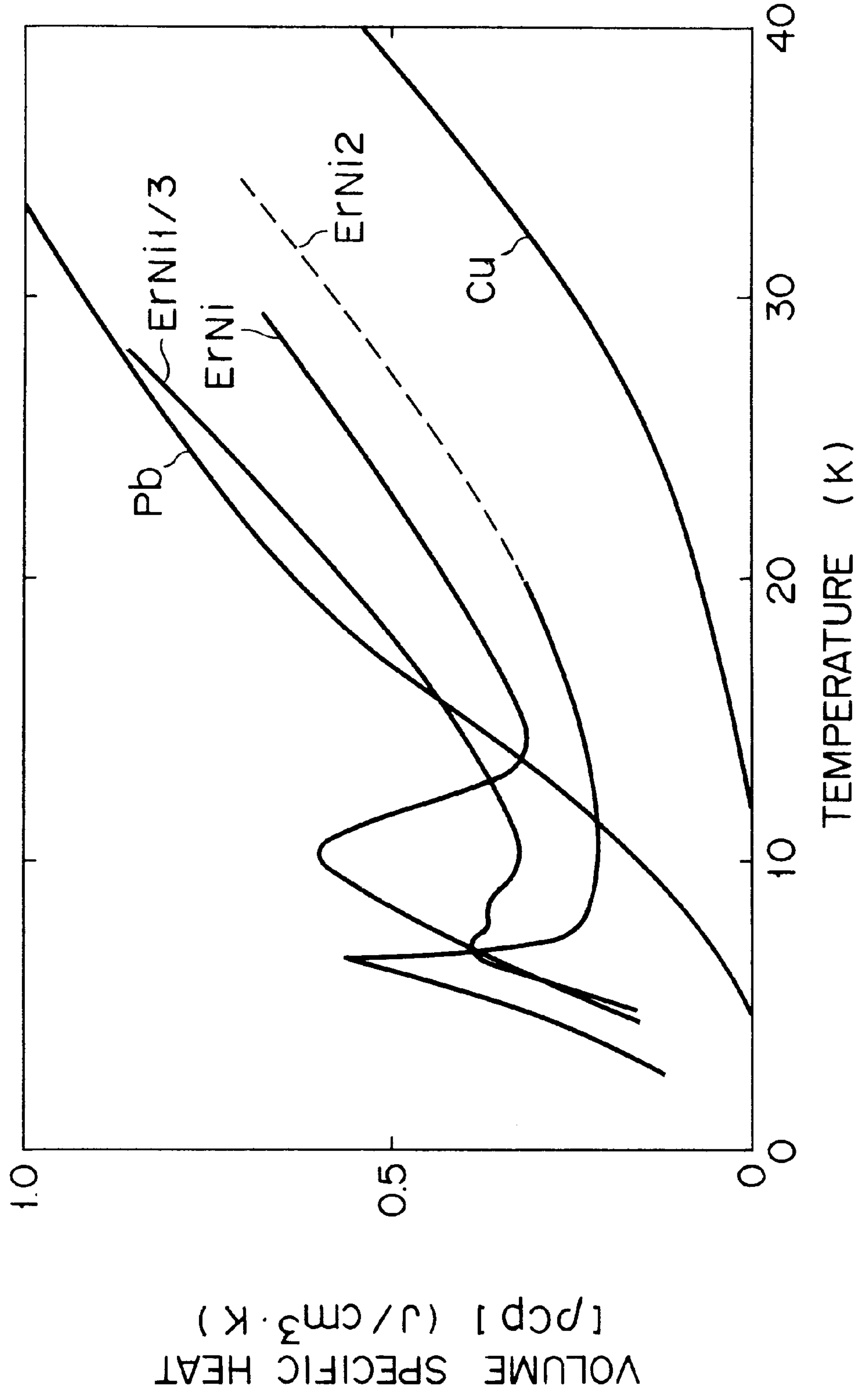
FIG. 3 is a graph showing how the volume specific heat, of the spherical magnetic (regenerative) substances according to the examples 1 to 3 of the invention and Pb and Cu which are conventional regenerative substances vary with temperatures in extremely low region.

SEM photographs were taken of these three magnetic substances thus made. These photographs were analyzed to show that each substance was spherical particles having a diameter ranging from 40 to 100 $\mu$m. Further, volume specific heat was measured of the three magnetic substances. The results of the measurement was as is shown in FIG. 3. In FIG. 3, the volume specific heats of Pb and Cu are also shown for comparison with those of Examples 1–3.

As is evident from FIG. 3, the magnetic substances of Examples 1–3 had volume specific heats greater than those of Pb and Cu, i.e., the conventional regenerative substances, at extremely low temperatures of about 15 K or less. FIG. 3 also demonstrates that the magnetic substances of Examples 1–3 had great lattice specific heats at temperatures of 15 K or more. Particularly, $ErNi_{1/3}$ (Example 1) and ErNi (Example 2), both being magnetic substances represented by the general formula (I), where $0.01 \leqq z < 2.0$, had lattice specific heats which are as great as that of Pb, at temperatures of 15 K or more.

The spherical particles of $ErNi_{1/3}$ (Example 1) were filled in a regenerator, and this regenerator was tested for its regeneration efficiency. More specifically, the spherical particles of Example 1, having an average diameter of 50 to 100 $\mu$m, were filled in the envelope of the regenerator, which was made of phenol resin, at the filling rate of 63%. This regenerator was subjected to the GM (Gifford-Mc Mahon) refrigeration cycle. The GM refrigeration cycle was conducted by supplying helium gas (heat capacity: 25 J/K) to the regenerator at the mass flow rate of 3 g/sec at pressure of 16 atms. The test revealed that the regenerator filled with the $ErNi_{1/3}$ spherical particles was improved within a range of the temperature of 40 K to 4 K at an efficiency more than eight times greater than that of the regenerator filled with the spherical lead particles of the same average diameter.

EXAMPLE 4 to 7

Four magnetic substances, $DyNi_{1/3}$ (Example 4), $Er_{0.5}Dy_{0.5}Ni_{1/3}$ (Example 5), $Er_{0.75}Dy_{0.25}Ni_{1/3}$ (Example 6), and $ErNi_{1/3}$ (Example 7) were prepared by means of an arc furnace. Each of these magnetic substances was processed in the same way as in Examples 1 to 3, thereby preparing four powdery magnetic substances. The SEM photographs of these substances showed that the substances were fine spherical particles having an average diameter of 40 to 100 $\mu$m.

Figure 4:
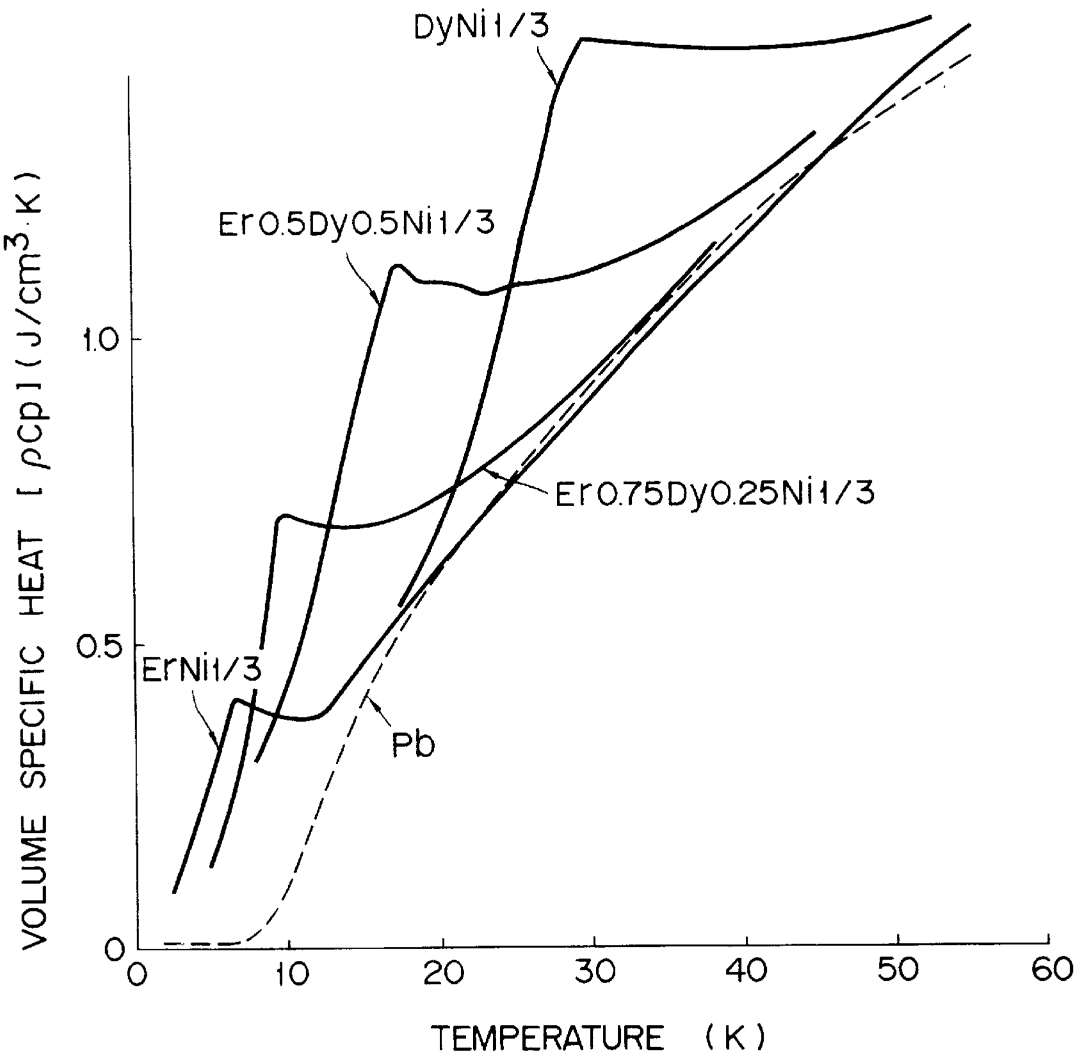
FIG. 4 is a graph showing how the volume specific heats of the spherical magnetic (regenerative) substances, i.e., examples 4 to 7 of the invention, and Pb, i.e., the conventional regenerative substance, vary with the temperature in an extremely low region.

Volume specific heat was measured of the four magnetic substances. The results of the measurement was as is shown in FIG. 4. In FIG. 4, the volume specific heat of Pb is also shown for comparison with those of Examples 4–7.

As is evident from FIG. 4, the magnetic substances of Examples 4–7 had volume specific heats greater than those of Pb, i.e., the conventional regenerative substances, at extremely low temperatures of about 15 K or less. FIG. 4 also demonstrates that the magnetic substances of Examples 4–7 had great lattice specific heats at temperature of 15 K or more. FIG. 4 futhermore shows that the temperature, at which each substance exhibited the maximul of volume specific heat, fell as the concentration of Er increased.

EXAMPLES 8 to 10

Three magnetic substances, $Er_{0.8}Pr_{0.2}Ni_{1/3}$ (Example 8), $Er_{0.7}Pr_{0.3}Ni_{1/3}$ (Example 9), and $Er_{0.6}Pr_{0.4}Ni_{1/3}$ (Example 10) were prepared by means of an arc furnace. Each of these substances was processed in the same way as in Examples 1 to 3, thereby preparing three powdery magnetic substances. The SEM photographs of these substances showed that the three substances were fine spherical particles having an average diameter of 40 to 100 $\mu$m.

EXAMPLE 11

The spherical particles of Examples 1 to 10 were filled in the envelopes of regenerators, which were made of phenol resin, at the filling rate of 65%. These regenerators were subjected to the GM refrigeration cycle. The GM refrigeration cycle was conducted by supplying helium gas (heat capacity: 25 J/K) to the regenerator at the mass flow rate of 3 g/sec at pressure of 16 atms. Also, the spherical particles of lead, used as a control and having the same average diameter as Examples 1 to 10 were filled in the envelope of a regenerator, which was made of phenol resin, at the same filling rate of 65%. This regenerator, used as a control, was subjected to the GM refrigeration cycle carried out in the same manner. The GM refrigeration test revealed that the regenerators filled with the substances of Examples 1 to 10 reached the temperature which was 1 K or more lower than the temperature at which regenerator filled with the lead (i.e., the control) reached under unloaded condition.

EXAMPLES 12 and 13

Two magnetic substances, $ErCo_{1/3}$ (Example 12), and ErCo (Example 13) were prepared by means of an arc furnace. Each of these magnetic substances, thus prepared, was heated at 750° C. for 24 hours. After this heat treatment, each substance was crushed by a Brown mill into particles. The particles were classified, thereby obtaining fine powder whose grain size was 100 to 200 μm. Thereafter, 200 g of each magnetic powder was plasma-sprayed in an argon atmosphere. Thus, two powdery magnetic substances (Examples 1–3) were prepared. The argon gas had pressure of 1.8 atms. at the final stage of the plasma spraying.

The SEM photographs of the two powdery substances showed that these were fine spherical particles having an average diameter of 40 to 100 μm.

The spherical particles of Examples 12 and 13 were filled in two regenerators, and these regenerators were tested for their regeneration efficiencies. More specifically, the spherical particles of Examples 12 and 13 were filled in the envelopes of two regenerators, which were made of phenol resin, at the filling rate of 65%. These regenerators were subjected to the GM refrigeration cycle. The GM refrigeration cycle was conducted by supplying helium gas (heat capacity: 25 J/K) to the regenerator at the mass flow rate of 3 g/sec at pressure of 16 atms. Also, the spherical particles of lead, used as a contol and having the same average diameter as Examples 12 and 13 were filled in the envelope of a regenerator, which was made of phenol resin, at the same filling rate of 65%. This regenerator filled with the lead particles used as a control, was subjected to the GM refrigeration cycle carried out in the same manner. The GM refrigeration test showed that the regenerators filled with the spherical particles of Examples 12 and 13 were improved at an efficiency more than eight times greater than that of the regenerator filled with the control.

EXAMPLES 14 to 16

Three magnetic substances, $Er_{0.8}Nd_{0.2}Co_{1/3}$ (Example 14), $Er_{0.7}Nd_{0.3}Co_{1/3}$ (Example 15), and $Er_{0.6}Nd_{0.4}Co_{1/3}$ (Example 16) were prepared by means of an arc furnace. Each of these substances was processed in the same way as in Examples 12 and 13, thereby preparing three powdery magnetic substances. The SEM photographs of the three substances ascertained that the powdery substances were fine spherical particles having an average diameter of 40 to 100 μm.

The spherical particles of Examples 14 to 16 were filled in three regenerators, and these regenerator were tested for their regeneration efficiencies. More specifically, the spherical particles of these examples were filled in the envelopes of the three regenerators, which were made of phenol resin, at the filling rate of 65%. These regenerators were subjected to the GM refrigeration cycle. The GM refrigeration cycle was conducted by supplying helium gas (heat capacity: 25 J/K) to the regenerator at the mass flow rate of 3 g/sec at pressure of 16 atms. Also, the spherical particles of lead, used as a control and having the same average diameter as Examples 14 to 16 were filled in the envelope of a regenerator, which was made of phenol resin, at the same filling rate of 65%. This regenerator filled with the lead particles used as a control, was subjected to the GM refrigeration cycle carried out in the same way as the regenerators filled with the substances of Examples 14 to 16. The GM refrigeration test showed that the regenerators filled with the spherical particles of Examples 14 to 16 were improved at an efficiency more than eight times greater than that of the regenerator filled with the control.

EXAMPLES 17 and 18

Two magnetic substances, $ErCu_2$ (Example 17) and ErCu (Example 18), were prepared by using an arc furnace. Each of these magnetic substances, thus prepared, was heated at 850° C. for 24 hours. After this heat treatment, each substance was crushed by a Brown mill into particles. The particles were classified, thereby obtaining fine powder whose grain size was 100 to 200 μm. Thereafter, 200 g of each magnetic powder was plasma-sprayed in an argon atmosphere. Thus, two powdery magnetic substances (Examples 17 and 18) were prepared. The argon gas had pressure of 1.8 atms. at the final stage of the plasma spraying.

The SEM photographs of the two powdery substances revealed that the substances were fine spherical particles having an average diameter of 40 to 100 μm.

The spherical particles of Examples 17 and 18 were filled in two regenerators, and these regenerators were tested for their regeneration efficiencies. More specifically, the spherical particles of these examples were filled in the envelopes of the two regenerators, which were made of phenol resin, at the filling rate of 65%. These regenerators were subjected to the GM refrigeration cycle. The GM refrigeration cycle was conducted by supplying helium gas (heat capacity: 25 J/K) to the regenerator at the mass flow rate of 3 g/sec at pressure of 16 atms. Also, the spherical particles of lead, used as a control and having the same average diameter as Examples 17 and 18 were filled in the envelope of a regenerator, which was made of phenol resin, at the same filling rate of 65%. This regenerator filled with the lead particles used as a control, was subjected to the GM refrigeration cycle carried out in the same way as the regenerators filled with the substances of Examples 17 and 18. The GM refrigeration test showed that the regenerators filled with the spherical particles of Examples 17 and 18 were improved at an efficiency more than seven times greater than that of the regenerator filled with the control.

EXAMPLES 19 to 24

Six magnetic substances, $ErNi_{1/3}$ (Example 19), ErNi (Example 20), $ErCo_{1/3}$ (Example 21), ErCo (Example 22), $ErCu_2$ (Example 23), and ErCu (Example 24), were prepared by using an arc furnace. Each of these magnetic substances, thus made, was flame-sprayed onto tungsten fabric formed of fibers having a diameter of 10 μm. Hence, six kinds of magnetic fabric were prepared, each having an average filament diameter ranging from 40 to 100 μm.

The fabrics of Examples 19 to 24 were filled in six regenerators, and these regenerators were tested for their regeneration efficiencies. More specifically, the magnetic fabrics of these examples were filled in the envelopes of the six regenerators, which were made of phenol resin, at the filling rate of 75%. These regenerators were subjected to the GM refrigeration cycle. The GM refrigeration cycle was conducted by supplying helium gas (heat capacity: 25 J/K)

to the regenerator at the mass flow rate of 3 g/sec at pressure of 16 atms. Also, fabric made of lead fibers, used as a control and having the same average diameter as Examples 19 to 24 were filled in the envelope of a regenerator, which was made of phenol resin, at the same filling rate of 75%. This regenerator filled with the lead particles used as a control, was subjected to the GM refrigeration cycle carried out in the same way as the regenerators filled with the substances of Examples 19 to 24. The GM refrigeration test revealed that the regenerators filled with the spherical particles of Examples 19 to 24 were improved at an efficiency more than ten times greater than that of the regenerator filled with the control.

What is claimed is:

1. An improved gas cycle refrigerator comprising:

a refrigerant;

a heat regenerative material for performing heat-exchange between said refrigerant and itself, wherein said heat regenerative material has a composition consisting essentially of:

$$AMz$$

where A is at least one rare earth element selected from the group consisting of Y, La, Ce, Pr, Nd, Pm, Sm, Eu, Gd, Tb, Dy, Ho, Er, Tm and Yb; M is at least one metal selected from the group consisting of Ni and Co; and z is 0.001 to 9.0; and an expansion means for expanding said refrigerant.

2. The refrigerator according to claim 1, in which $0.01 \leqq z < 2.0$.

3. The refrigerator according to claim 1, in which $1/3 \leqq z \leqq 1.0$.

4. The refrigerator according to claim 1, wherein said heat regenerative material has a composition consisting essentially of:

$$ANiz$$

where A is at least one rare earth element selected from the group consisting of Y, La, Ce, Pr, Nd, Pm, Sm, Eu, Gd, Tb, Dy, Ho, Er, Tm, and Yb; and z is 0.1 to 9.0.

5. The refrigerator according to claim 4, in which $0.1 \leqq z < 2.0$.

6. The refrigerator according to claim 1, wherein said heat regenerative material has a composition consisting essentially of:

$$A'_{1-x}D_xM_z$$

where A' is at least one heavy rare earth element selected from the group consisting of Er, Ho, Dy, Tb, and Gd; D is at least one light rare earth element selected from the group consisting of Pr, Nd, Sm, and Ce; M is at least one metal selected from the group consisting of Niand Co; x is equal to or greater than zero, and less than 1; and z is 0.01 to 9.0.

7. The refrigerator according to claim 6, in which $0.1 \leqq z < 2.0$.

8. The refrigerator according to claim 1, in which said magnetic substance is in the form of particles having an average diameter of 1 to 2000 μm.

9. The refrigerator according to claim 1, in which said heat regenerative material is in the form of filaments having an average diameter of 1 to 2000 μm.

10. An improved gas-cycle refrigerator comprising:

a refrigerant;

a heat regenerative material for performing heat-exchange between said refrigerant and itself, wherein said heat regenerative material has a composition consisting essentially of:

$$A\,(M_{1-y}L_y)z$$

where A is at least one rare earth element selected from the group consisting of Y, La, Ce, Pr, Nd, Pm, Sm, Eu, Gd, Tb, Dy, Ho, Er, Tm, and Yb; M is at least one metal selected from the group consisting of Ni and Co; L is at least one compound-forming element selected from the group consisting of B, Al, Ga, In, Si, Ge, Sn, Pb, Ag, Au, Mg, Zn, Ru, Pd, Pt, Re, Cs, Ir, Fe, Mn, Cr, Cd, Hg, and Os; y ranges from 0 to 0.3 when L is Fe, and y is equal to or greater than 0 and less than 1.0 when L is not Fe, preferably from 0 to 0.5; and z ranges from 0.001 to 9.0; and an expansion means for expanding said refrigerant.

11. An improved gas-cycle refrigerator:

a refrigerant;

a heat regenerative material for performing heat-exchange between said refrigerant and itself, wherein said heat regenerative mater has a composition consisting essential of:

$$A'_{1-x}D_x(M_{1-y}L_y)Z$$

where A' is at least one heavy rare earth element from the group consisting of Er, Ho, Dy, Tb, and Gd; D is at least one light rare earth element selected from the group consisting of Pr, Nd, Sm and Ce; M is at least one metal selected from the group consisting of Ni and Co; L is at least one compound-forming element selected from the group consisting of B, Al, Ga, In, Si, Ge, Sn, Pb, Ag, Au, Mg, Zn, Ru, Pd, Pt, Re, Cs, Ir, Fe, Mn, Cr, Cd, Hg, and Os; x is equal to or greater than 0, and less than 1; y ranges from 0 to 0.3 when L is Fe, and is equal to or greater than 0 and less than 1.0 when L is not Fe, preferably from 0 to 0.5; and z ranges from 0.001 to 9.0; and an expansion means for expanding said refrigerant.

12. The refrigerator according to claim 1, wherein said refrigerant is helium.

13. The refrigerator according to claim 1, wherein z falls within a range of between 0.01 and 1.0, i.e., $0.01 \leqq z < 1.0$.

14. The refrigerator according to claim 5, wherein said heat regenerative material is $ErNi_{1/3}$.

15. The refrigerator according to claim 1, wherein said "A" is at least one rare earth element selected from the group consisting of Er, Py, Ho and Nd.

16. The refrigerator according to claim 1, wherein z is not larger than 1.0, i.e., $z \leqq 1.0$.

* * * * *